United States Patent [19]
Clerc

[11] Patent Number: 5,136,407
[45] Date of Patent: Aug. 4, 1992

[54] LIQUID CRYSTAL DISPLAY HAVING APERTURES IN THE ELECTRODES

[75] Inventor: Jean-Frédéric Clerc, Yokohama, Japan

[73] Assignee: Stanley Electric Co., Ltd., Tokyo, Japan

[21] Appl. No.: 664,035

[22] Filed: Mar. 4, 1991

[30] Foreign Application Priority Data

Mar. 8, 1990 [JP] Japan .................................. 2-55783

[51] Int. Cl.$^5$ .................................. G02F 1/343
[52] U.S. Cl. .................................. 359/55; 359/87
[58] Field of Search .................. 350/336, 334; 359/54 US, 87 US, 89 US, 55 US

[56] References Cited

U.S. PATENT DOCUMENTS

| | | | |
|---|---|---|---|
| 4,023,890 | 5/1977 | Shirasu et al. | 350/336 |
| 4,140,371 | 2/1979 | Kanazaki et al. | 350/336 |
| 4,741,600 | 5/1988 | Pirs et al. | 350/336 |
| 4,759,609 | 7/1988 | Clerc | 350/333 |
| 4,775,224 | 10/1988 | Germain et al. | 350/336 |
| 5,002,367 | 3/1991 | Nicholas | 359/54 |

FOREIGN PATENT DOCUMENTS 60-46225 8/1985 Japan .

Primary Examiner—Stanley D. Miller
Assistant Examiner—Ron Trice
Attorney, Agent, or Firm—Frishauf, Holtz, Goodman & Woodward

[57] ABSTRACT

A dot matrix type liquid crystal display device having two groups of mutually crossing parallel electrodes sandwiching a liquid crystal layer, the electrodes of one group having an aperture at each electrode crossing area along the direction of and centrally at the electrode of the other group. The electric field at the aperture portion is constantly slanted to a predetermined direction to present uniform and wide stable display areas.

6 Claims, 3 Drawing Sheets

FIG. IA
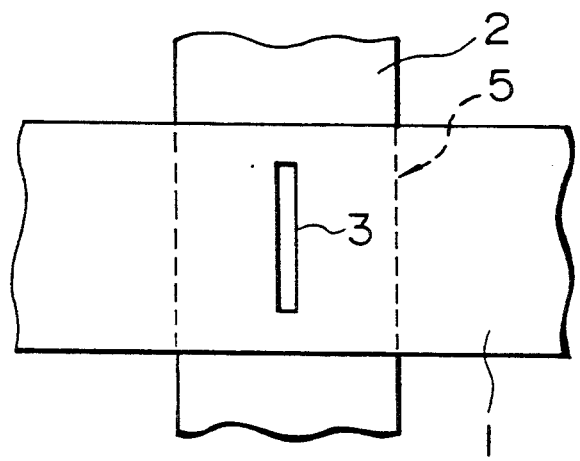
FIG. IB
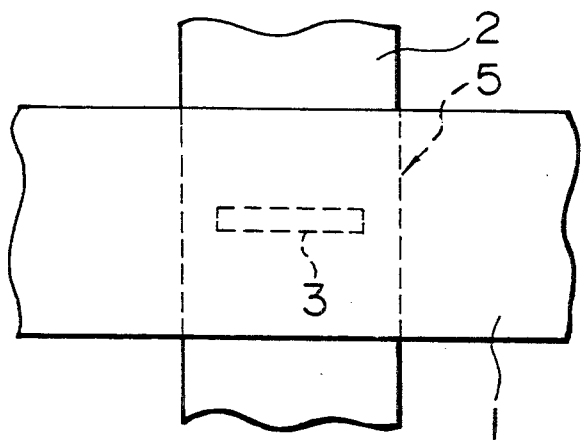
FIG. IC
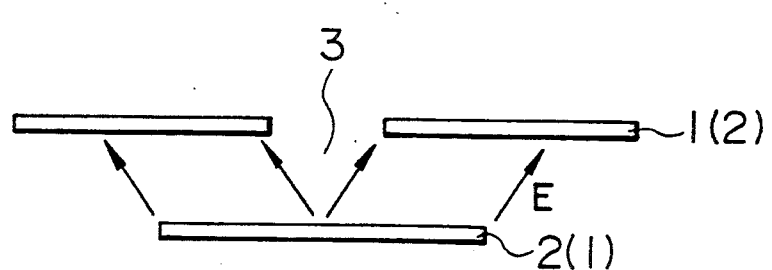

"ON" STATE

LIQUID CRYSTAL DISPLAY HAVING APERTURES IN THE ELECTRODES

BACKGROUND OF THE INVENTION

1. Field of the Invention

This invention relates to a liquid crystal display device, and more particularly to a dot matrix type liquid crystal display device adapted for displaying arbitrary shapes on a display surface.

Although description will mainly be made, taking color super homeotropic (CSH) liquid crystal display (LCD) as an example, the invention is not limited to CSH LCD. For example, it can also be applied to a homogeneous LCD.

2. Description of the Related Art

In a CSH LCD, homeotropically or substantially homeotropically oriented nematic liquid crystal molecules are electrically controlled in their birefringence to achieve a desired display.

A CSH LCD without pre-tilt according to the prior art will be described, referring to FIGS. 2A to 2D.

As shown in FIG. 2A, a liquid crystal molecule 10 has an elongated shape, and has a higher optical constant (refractive index) along the long axis. Further, the liquid crystal molecule has an electric bipole along a direction orthogonal to the long axis. In the "off" state where an electric field above a certain value is not applied between the electrodes, the liquid crystal molecules take the long homeotropic orientation where the long axis is normal to the surface of the substrate, as shown in the left part of FIG. 2A. When an electric field E is applied normal to the substrate, there occurs a force in a direction which drives the electric dipole of the liquid crystal molecules to follow the direction of the electric field and the liquid crystal molecule 10 is tilted as shown in the right part of FIG. 2A. This angle of tilt is called tilt angle, and is of the order of 10 degrees, for example.

FIG. 2B shows an electric field distribution in the electrode crossing portion in the liquid crystal display device. A pair of glass substrates 11 and 12 are disposed parallel to face each other. On the inner surfaces of the substrate, segment electrodes 1a and 1b and common electrode 2 are formed in a crossing relation. The common electrode 2 defines the row of the dot matrix and the segment electrodes 1a and 1b define the column of the dot matrix. On the outer surfaces of the glass substrate 11 and 12, crossed polarizers 13 and 14 are disposed. When a voltage is applied between the segment electrodes 1a and 1b and the common electrode 2, an electric field is established between the electrodes. At the edge of the electrode, fringe effect due to the edge is produced. Namely, the electric force line starting from the edge of the segment electrode 1a or 1b, for examplle, is bulged towards the common electrode 2 as shown by the broken line in FIG. 2B to have a lateral or horizontal component as well as the vertical component. The liquid crystal molecule changes its tilt according to the electric field distribution.

Such distribution of the liquid crystal molecules is shown in FIG. 2C in more detail.

FIG. 2C shows schematically how the liquid crystal molecules are distributed in the electrode crossing area 5. The electrode crossing area 5 is defined between the vertical facing edges 6a and 6b and between the horizontal facing edges 7a and 7b. Since the common electrode 2 extends long in the horizontal direction, the electric force line at the facing edges 6a and 6b, starting from the edges of the segment electrodes 1a and 1b are diverged outwardly as shown by the arrow. Since the segment electrodes 1a and 1b extend long in the vertical direction, the electric force line at the horizontal facing edges 7a and 7b of the electrode crossing area 5, starting from the segment electrode are distributed to be oriented from the outside to the inside. Here, the polarization axes P1 and P2 of the crossed polarizers are disposed at angles 45 degrees slanted from both the row and the column as shown in the right part of FIG. 2C. The liquid crystal molecule has a function of rotating the polarized light when tilted from the normal direction, but those liquid crystal molecules which are slanted in the direction of the polarization axes P1 and P2 have no such function. Therefore, the light is cut off by the crossed polarizers.

Therefore, as shown in FIG. 2D, there appear crossing black lines in each cell. Namely, as shown in FIG. 2D, the electrode crossing area 5 is divided into four regions D1, D2, D3 and D4. At the crossing point X of these four regions, the liquid crystal molecules are kept normal to the substrates 11 and 12 as shown in FIG. 2D. On the black lines 8, the liquid crystal molecules are tilted in the direction of the polarization axis P1 or P2. In the four regions D1, D2, D3 and D4, the liquid crystal molecules are tilted substantially leftward, rightward, upward and downward, respectively, as shown in FIG. 2D.

In the liquid crystal display device as described above, the shapes and the areas of the four regions D1, D2, D3 and D4 divided by the crossing black lines vary according to the balance of the various condition, are not constant and differ from cell to cell.

In order to solve the varying and crossing black lines in the display, a preliminary pre-tilt angle in a certain direction may be given to the liquid crystal molecules. For example, referring to FIG. 2D, when a pre-tilt angle of not more than one degree in a direction corresponding to the region D3 is given to the liquid crystal molecules in the whole electrode crossing area, almost all the liquid crystal molecules will be tilted in the same direction when an electric field is applied. Then, the most part of the electrode crossing area 5 will be occupied by the region D3. Namely, the other three regions D1, D2 and D4 become extremely small areas in the display and the quality of display is greatly improved. When such a pre-tilt is given to control the orientation direction of the liquid crystal molecules, another problem arises.

Namely, when the most part of the electrode crossing area 5 is occupied by the region D3, and when the liquid crystal display device is observed from a direction coinciding with the long axes direction of the liquid crystal molecules in the region D3, the liquid crystal molecules lose the optical rotatary power. Then, the whole surface of the display appears black. This black hole like observation angle appears, for example, at a position about 10 degrees from the normal direction to the surface of the liquid crystal display device. The fact that this black hole phenomenon appears very near the normal direction to the surfaces causes a large problem in the performance of the display device.

According to the prior art as described above, the shapes and the positions of the crossing black lines in the display area vary uncertainly to cause a problem in the display performance, or there arises a direction near the normal to the display surface in which the display quality is extremely low.

SUMMARY OF THE INVENTION

An object of this invention is to provide a liquid crystal display device capable of providing a display of substantially uniform and good quality in the most part of the electrode crossing area.

According to an embodiment of this invention, there is provided a dot matrix type liquid crystal display device comprising, a pair of parallel substrates disposed to face each other, two groups of electrodes disposed on said pair of substrates, respectively, and crossing each other when projected normal to one of said substrates, each electrode being elongated and having substantially parallel side edges, and at least one elongated aperture formed in one electrode of one of said two groups of electrodes at a portion crossing another electrode of the other group of electrodes and extending along the direction of the side edges of said another electrode.

By providing such an elongated aperture in at least one electrode of one of the two groups of electrodes crossing mutually, the lateral component of the electric field due to the edge of the electrode crossing area can be positively utilized.

In the display device which does not utilize the pretilt angles, the shape and the areas of the display regions are uncertain. By providing an aperture, the electrode crossing area can be divided almost into two major regions. In each major region, the electric field is tilted in a constant direction to enable uniform display.

The present invention will be described in detail below in conjunction with the accompanying drawings.

BRIEF DESCRIPTION OF THE DRAWINGS

FIGS. 1A, 1B and 1C show basic embodiments of this invention. FIG. 1A is a plan view of the first structure. FIG. 1B is a plan view of the second structure. FIG. 1C is a cross section for showing the electric field distribution in the cell schematically.

FIG. 2A is a schematic cross section showing the liquid crystal molecule. FIG. 2B is a schematic cross section for showing the orientation of the liquid crystal molecules in the electrode crossing area. FIG. 2C is a schematic plan view for illustrating the orientation of the liquid crystal molecules in the "on" states. FIG. 2D is a plan view showing an example of display appearance of the device of FIG. 2C.

FIG. 3A is a perspective view of the structure. FIG. 3B is a plan view showing the arrangement of the electrode crossing area. FIG. 3C is schematic cross section illustrating the electric field distribution. FIG. 3D is schematic plan view for illustrating the orientation of the liquid crystal molecules. FIG. 3E is a plan view for illustrating an example of the display appearance.

Figure 2A:
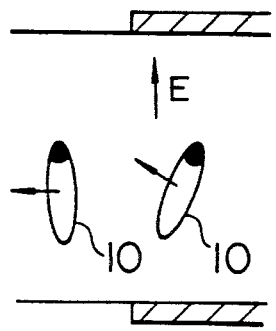
FIGS. 2A, 2B, 2C and 2D show the prior art.
Figure 2B:
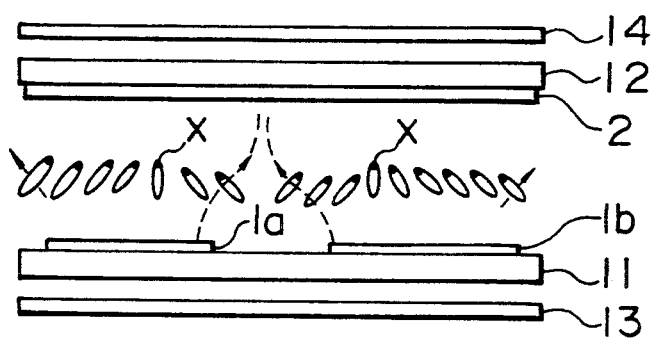
Figure 2C:
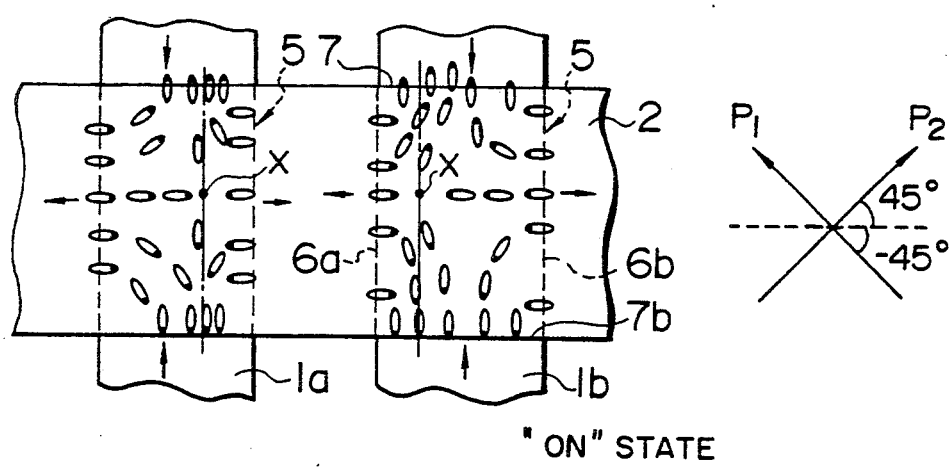
Figure 2D:
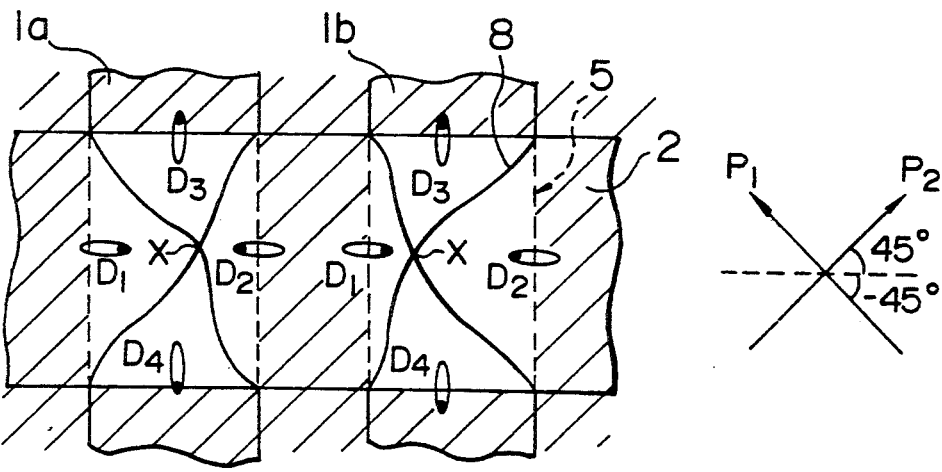

In the figures, reference numerals denote the following: 1 electrodes of one group, 2 electrodes of the other group, 3 aperture, 5 electrode crossing area, 10 liquid crystal molecule, 11 and 12 glass substrates, 13 and 14 crossed polarizers, 16 common electrode, 17 segment electrode and 18 aperture.

DESCRIPTION OF THE PREFERRED EMBODIMENTS

Firstly, the basic embodiments of this invention are shown in FIGS. 1A to 1C. In a dot matrix type liquid crystal display device, two groups of parallel stripe electrode are formed on a pair of facing transparent substrates respectively, to cross each other. In FIGS. 1A to 1C, one electrode crossing area 5 is shown.

FIG. 1A shows a first embodiment of the electrode. In the figure, an electrode 1 of one group disposed horizontally and another electrode 2 of another group disposed vertically are disposed to cross orthogonally to each other. Although each one electrode is shown in the figure, there are provided a multiplicity of electrodes in each group in a practical dot matrix type liquid crystal display device. In the electrodes 1 of one group among the crossing two groups of electrodes, apertures 3 are formed substantially parallel to the edges (the edges extending vertically in the figure) of the electrodes 2 of the other group. Namely, an aperture 3 is formed in each electrode crossing area 5 to divide the electrode crossing area 5 largely into two regions.

FIG. 1B shows a second embodiment of the electrodes. In this structure, instead of providing apertures in the electrode 1 of the one group, apertures 3 are formed in the electrodes 2 of the other group, which are disposed substantially parallel to the edges of the electrodes of the one group. The electrode crossing area is divided by the aperture 3 into the upper and lower regions.

By forming the apertures 3 in the electrode crossing area 5, the electric field distribution in the electrode crossing area becomes as shown FIG. 1C. FIG. 1C shows the case of FIG. 1A, but when the configuration is turned upside down as indicated by the reference numerals in the parentheses, it shows the case of FIG. 1B.

In FIG. 1C, an electrode 2 of the other group disposed in the lower part extends perpendicular to the plane of sheet, and another electrode 1 of the one group disposed on the upper side extends horizontally. In the electrode 1 of one group, an aperture 3 is formed. The electric force line starting from the central portion of the electrode 2 of the other group toward the electrode 1 of one group is directed to the edge of the aperture 3, while being diverged. At the edges of the electrode 2 of the other group, the electric force lines are slanted outwards due to the existence of the electrode 1 of the one group extending horizontally. Therefore, in the right part of the electrode crossing area, the electric force lines are slanted rightward from the normal direction, and in the left part, the electric force lines are slanted leftward. Namely, the electrode crossing area 5 is divided into substantially uniform two regions by the aperture. The division is almost uniquely determined by the position of the aperture 3. Thus, a uniform display can be obtained throughout the liquid crystal display device. Further, when the liquid crystal display device is observed while being slanted in the state where an electric field is applied, even when half of the electrode crossing area appears black when the liquid crystal display device is observed from the direction of the arrow E shown in the right part of the figure, the remaining half of the display surface keeps the normal display. Thus, the phenomenon that the liquid crystal display surface becomes totally black as appears in the conventional liquid crystal display device utilizing the pre-tilt can be prevented.

FIGS. 3A to 3E show a liquid crystal display device according to a more concrete embodiment of this invention.

Figure 3A:
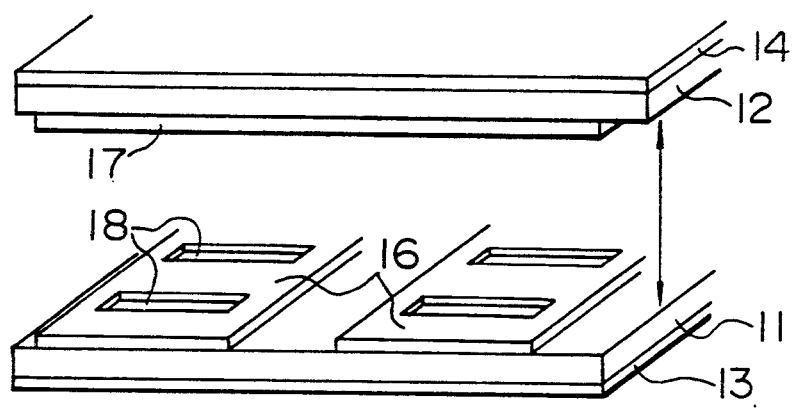
FIGS. 3A, 3B, 3C, 3D and 3E show a liquid crystal display device according to more concrete embodiment of this invention.

FIG. 3A is a perspective view of a partial structure of the CSH liquid crystal display device. A pair of glass substrate 11 and 12 are disposed to face each other and to define a space for containing the liquid crystal. On the lower glass substrate 11, a plurality of common electrode 16 are disposed in parallel. In the common electrode 16, elongated apertures 18 are formed substantially perpendicular to the direction in which the common electrodes extends. On the surface of the upper glass substrate 12, a plurality of thinner segment electrodes 17 are disposed in parallel and perpendicular to the direction of the common electrode 12. On the outside of the pair glass substrates 11 and 12, crossed polarizers 13 and 14 are disposed.

Figure 3B:
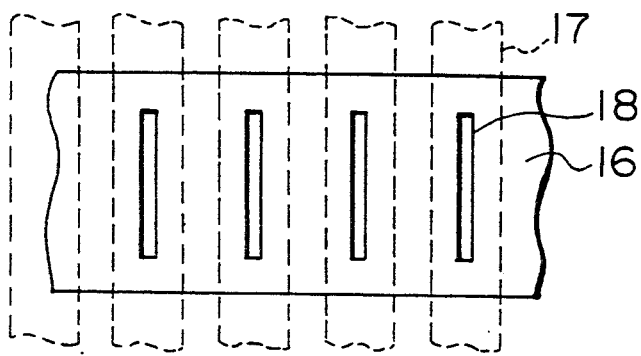

FIG. 3B shows an example of the configuration of the electrode crossing area. In the common electrode 16, elongated apertures 18 are formed along the direction perpendicular to the longitudinal direction of the common electrode 16 and corresponding to each central portion of the segment electrode 17. The position where the segment electrode 17 are to be disposed are shown in broken lines. For example, the segment electrode 17 has a width of about 100 μm while the common electrode 16 has a width of about 300 μm. The cell gap between the two electrodes is, for example, about 5 μm. The aperture 18 has, for example, a width of about 10 μm and a length of about 240 μm. The width of the apertures is preferably at least about twice the gap (cell gap) between the two electrodes. The aperture 18 is disposed centrally to the segment electrode 17. Therefore, the segment electrode 17 has a width of about 45 μm and either side of the aperture 18. Also, there remains a width of about 30 μm between each longitudinal edge of the aperture 18 and the edge of the common electrode 16.

The common electrode 16 is formed, for example, of indium tin oxide (ITO) and has a sheet resistance of about 10 Ω/□. The width of the aperture 18 is preferably determined relative to the thickness of the liquid crystal layer. For example, when the liquid crystal layer has a thickness of about 5 μm, the aperture 18 is designed to have a width of not less than about 10 μm. Then, the electric field can be effectively tilted in the aperture 18.

Figure 3C:
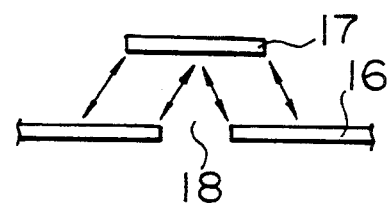

FIG. 3C schematically shows the electric field distribution in the electrode crossing area. The segment electrode 17 extends perpendicular to the plane of sheet, and the common electrode 16 extends horizontally in the sheeet. Due to the existence of the aperture 18, the electric force line emanating from the central portion of the segment electrode 17 can not exist vertically in the figure, and hence is directed to the edge of the aperture 18. In the case when the liquid crystal layer has a thickness of about 5 μm and the aperture 18 has a width of about 10 μm, the electric force line going to the edge of the aperture 18 will be slanted about at 45 degrees relative to the normal of the surface of the electrode. The direction of this slant is of the same direction to the fringe electric field at the edge portion of the segment electrode 17. Thus, forming a boundary at the aperture 18, the right side part has an electric field which is uniformly slanted in one direction, and the left side part has an electric field which is uniformly slanted in the opposite direction.

Figure 3D:
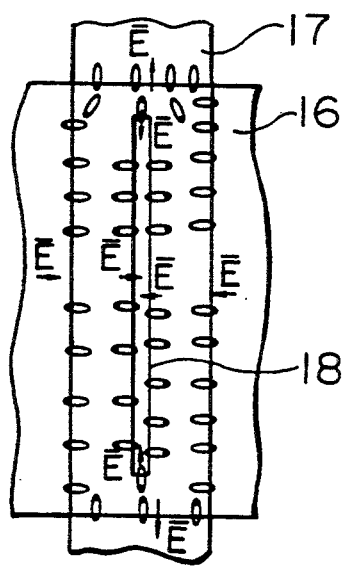

FIG. 3d shows how the liquid crystal molecules are oriented by the electric field thus formed. In the figure, the lateral component of the electric field is represented by arrows. A case where the electric field is formed from the common electrode 16 to the segment electrode 17 is shown. On the righthand side of the aperture 18, the electric field emanating from the common electrode 16 and terminating at the segment electrode 17 has a lateral component which is directed from the right side of the left side in the figure. In the left hand side of the aperture 18, the electric field emanating from the common electrode 16 and terminating at the segment electrode 17 has a lateral component directed from the left side to the right side. Due to these lateral electric field components, the liquid crystal molecules are slanted in the opposite direction on the right hand side and on the left hand side of the aperture. Here, between the edges of the aperture 18 and the edges of the common electrode 16, there are produced other regions where the liquid crystal molecules are oriented in other directions.

Figure 3E:
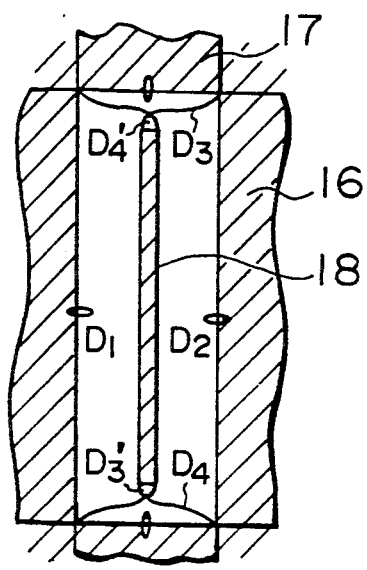

The electrode crossing area where the liquid crystal molecules are oriented in this way appears, for example, as shown FIG. 3E. Namely, on the left hand side of the aperture 18, a uniform wide region D1 is formed, and on the right hand side of the aperture a similarly uniform and wide region D2 is formed. On the upper side and the lower side of the aperture 18, narrow regions D3 and D4 are formed. Further, in the upper area, a yet smaller region D4' is formed between the aperture 18 and the region D3. Also, at the lower side of the aperture 18 a similarly yet smaller region D3' is formed between the region D4 and aperture 18. These small regions D3 and D4 and yet smaller regions D3' and D4' only occupy a very small area in the display area. Therefore, even when the shapes and the positions of these regions may vary to some extent, the influence thereof on the display quality is low.

It is preferable, as described above, to have the width of the aperture at least twice the thickness of the liquid crystal layer and hence to slant the direction of the electric field at the aperture at least about 45 degrees from the normal to the surface. Here, by forming the aperture in the common electrode, the resistance of the common electrode thereat increases to some extent. For depressing the increase of the resistance not to give a substantial obstacle, the width of the aperture and the width of the common electrode remaining at the both sides of the aperture are selected appropriately, for example, so that the sum of the widths of the region of the common electrode remaining on the both sides of the aperture is preferably set to be at least five times the width of the aperture.

When the aperture is disposed centrally to the segment electrode, the liquid crystal display device shows a symmetric performance with respect to the observation angle. In at least half of the electrode crossing area, display can be rigidly done. Thus, it is prevented to cause a black hole like observation angle where the brightness and the contrast are very low, in the neighborhood of the normal to the surface of the liquid crystal display device.

The regions D3 and D4 having different orientation directions, formed at the both edges of the aperture can be suppressed in area to be each about 5% or less of the total display area of the electrode crossing area.

In this way, a uniform CSH liquid crystal display device without a black hole where the brightness and the contrast decreases extremely, can be produced.

As is described above, according to the embodiments of this invention, the electric field distribution between the electrodes can be made stable and uniform by providing the aperture in one electrode in the electrode crossing area to improve the quality of display.

Although the description has been made of preferred embodiments of this invention, the present invention is not limited thereto. For example, it will be apparent to those skilled in the art that various substitutions, alterations, replacements, improvements or combinations are possible within the scope of the claims.

I claim:

1. A dot matrix type liquid crystal display device comprising:
    a pair of parallel substrates disposed to face each other;
    two groups of electrodes disposed on said pair of substrates, respectively, and crossing each other at a plurality of crossing portions when projected normal to one of said substrates, each electrode of said groups of electrodes being elongated and having substantially parallel side edges;
    an elongated aperture formed in one electrode of one of said two groups of electrodes at a plurality of said crossing portions where another electrode of the other group of said two groups of electrodes crosses said respective one electrode, said elongated apertures each having a long side extending along the sides of said respective another electrode in the direction of elongation of said respective another electrode.

2. A dot matrix type liquid crystal display device according to claim 1, wherein electrodes of said one of said two groups of electrodes have a larger width than electrodes of said other group of electrodes.

3. A dot matrix type liquid crystal display device according to claim 1, wherein each of said elongated apertures is disposed at a given position in a width direction of said another electrode of said other group of electrodes, when projected normal to said one of said substrates.

4. A dot matrix type liquid crystal display device according to claim 3, wherein each of said elongated apertures is disposed at a central portion in a width direction of said another electrode of said other group of electrodes, when projected normal to said one of said substrates.

5. A dot matrix type liquid crystal display device according to claim 3, wherein said two groups of electrodes have a gap therebetween at said crossing portions, and each of said elongated apertures has a first width which is at least about twice said gap between said groups of electrodes.

6. A dot matrix type liquid crystal display device according to claim 4, wherein each electrode of said one group of electrodes has a first width, and wherein said apertures each define side portions in said one electrode adjacent to the longitudinal ends of the respective elongated aperture, and said side portions have a combined second width in a longitudinal direction of the elongated aperture, which is at least about one-fifth of the first width.

* * * * *